Dec. 25, 1934.  W. D. YERRICK  1,985,268
PREHEATER CONSTRUCTION
Filed Feb. 5, 1931   4 Sheets-Sheet 3

INVENTOR.
William D. Yerrick
BY Nathaniel Frucht
his ATTORNEY

Dec. 25, 1934.　　W. D. YERRICK　　1,985,268
PREHEATER CONSTRUCTION
Filed Feb. 5, 1931　　4 Sheets-Sheet 4

INVENTOR.
William D. Yerrick
BY Nathaniel Frucht
his ATTORNEY

Patented Dec. 25, 1934

1,985,268

UNITED STATES PATENT OFFICE 1,985,268

PREHEATER CONSTRUCTION

William D. Yerrick, Wellsville, N. Y., assignor to Air Preheater Corporation, a corporation of New York Application February 5, 1931, Serial No. 513,658

3 Claims. (Cl. 257—6)

My present invention relates to heat exchangers, and has particular reference to air preheaters of the regenerative type.

Modern power and industrial plants all includes preheaters for preheating combustion air, in order to increase efficiency of operation and reduce loss of heat in the flue gases. These preheaters are necessary bulky and require a large amount of flow space; in addition, as the load on the plant increases in response to natural growth in demand, it becomes a difficult matter to add further preheating units or to increase the efficiency and the load of the units in use.

The present invention has for its object the elimination of these difficulties by providing a standard preheater unit which may be used to form plant preheaters of any desired capacity, and which may be easily added to or removed from an existing plant preheater to change the loading thereof. These standard units are suitably constructed to facilitate removal, replacement, or addition of units, and while primarily suitable for regenerative preheaters of the rotary type, are also applicable to stationary and other preheater types.

While these and other advantageous features in view, the invention consists of certain novel features of arrangement and construction disclosed more fully in the detailed description following, in conjunction with the accompanying drawings, and defined with more particularity in the appended claims.

Figure 1:
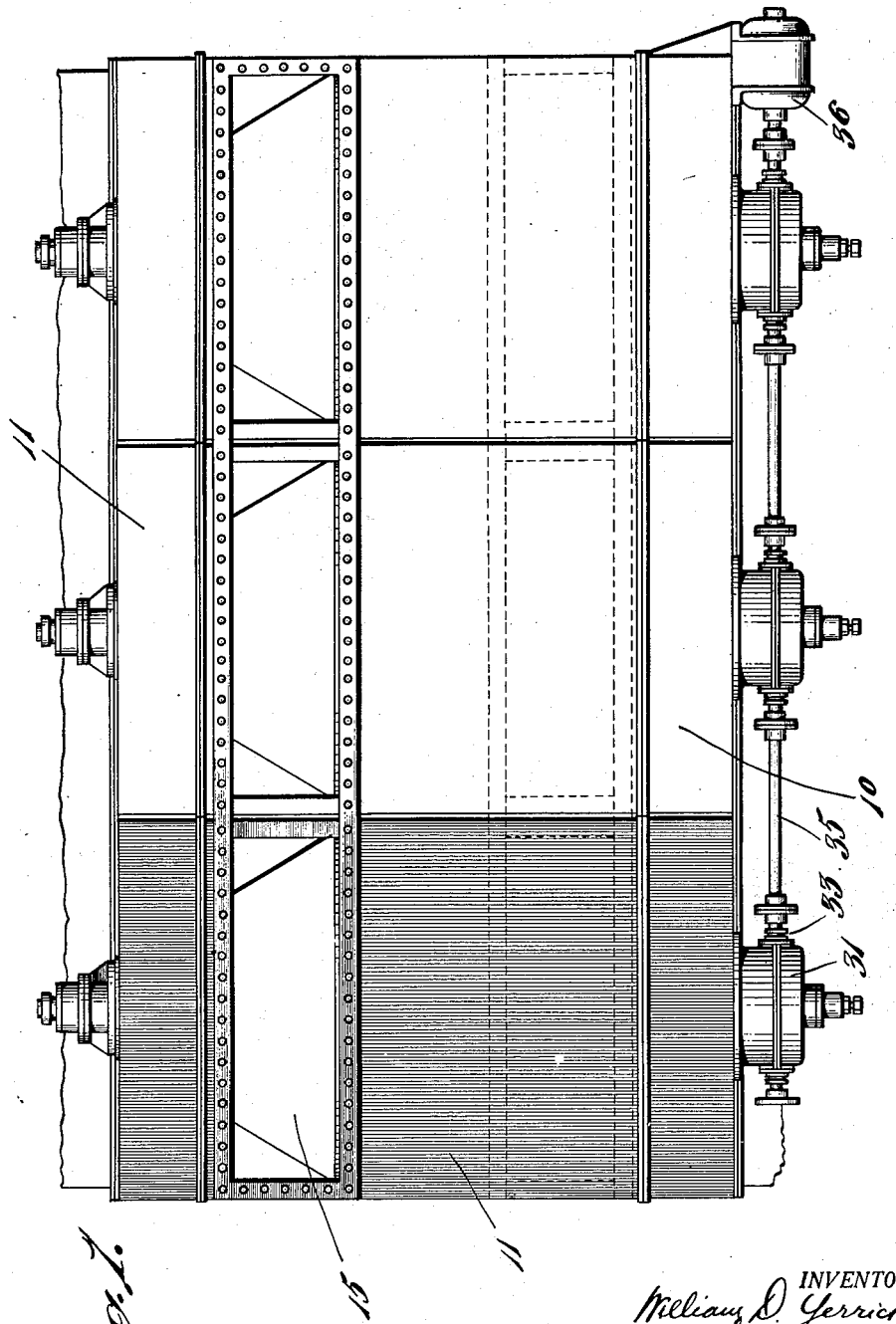
Fig. 1 is an elevation showing a battery of three preheater units.

It has been found desirable to form an air preheater of separate similar units, in order that an air preheater of any desired capacity may readily be formed by assembling the proper number of units; and it has been found that such construction facilitates replacement and repair, reduces manufacturing costs by standardizing parts, and permits the formation of a relatively narrow preheater of substantial length suitable for mounting in the rear of modern boiler plants. One embodiment of my invention as applied to regenerative preheaters of the rotary type is disclosed in the accompanying drawings.

In the drawings, a preheater battery 10 is formed of a plurality of separate preheater units 11, each unit being structurally distinct, but having common air inlet and outlet manifolds 12, 13 and common flue gas inlet and outlet manifolds 14, 15.

Figure 4:
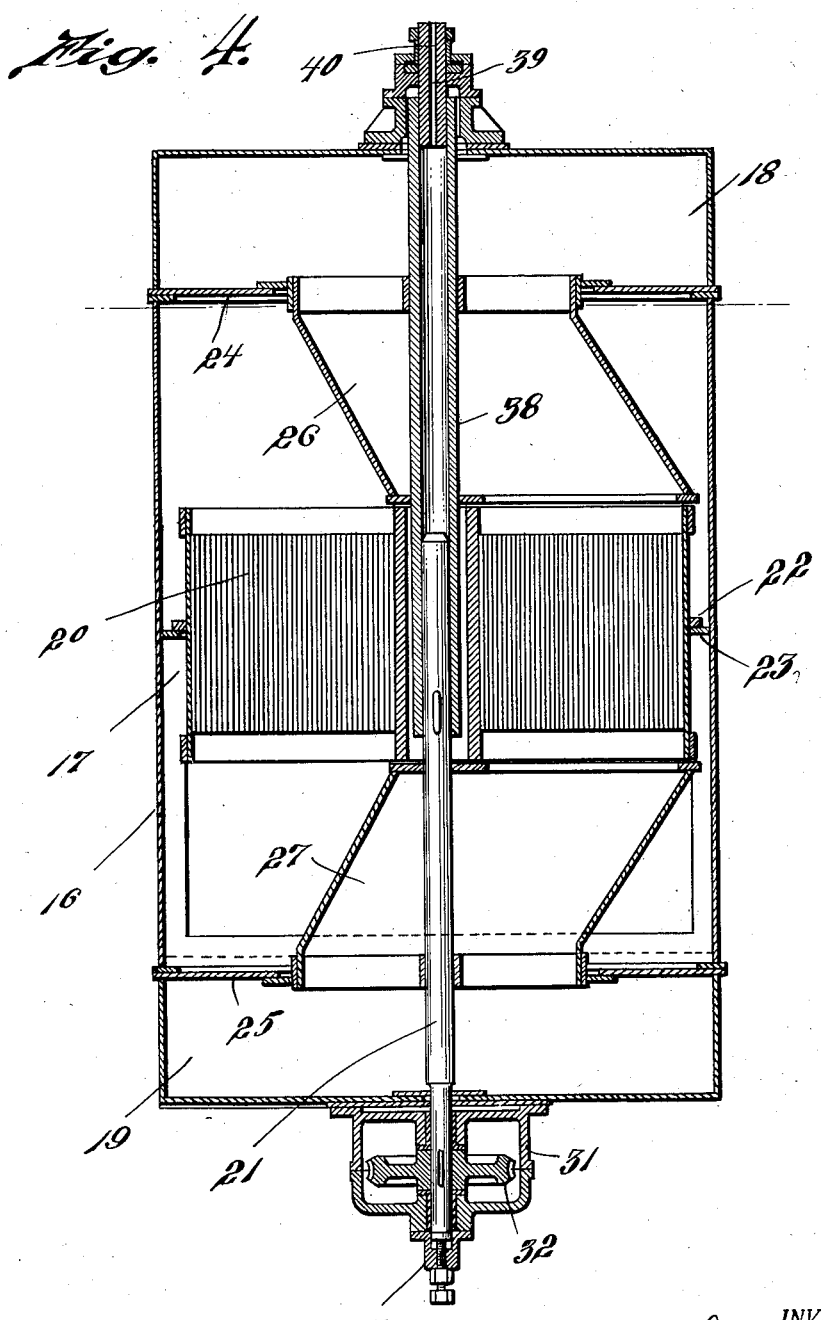
Fig. 4 is a vertical section through one unit.

As shown in Figure 4, each unit includes an outer casing 16 with a central chamber 17, a heated air chamber 18 at the upper end, and a cold air chamber 19 at the lower end, the central chamber having a regenerative annulus 20 therein which is provided with a central flange 22 cooperating with an annular flange or partition 23 in the casing to seal passage of fluid from one end of the casing to the other and provide intermediate flue gas chambers between the air chambers.

Figure 3:
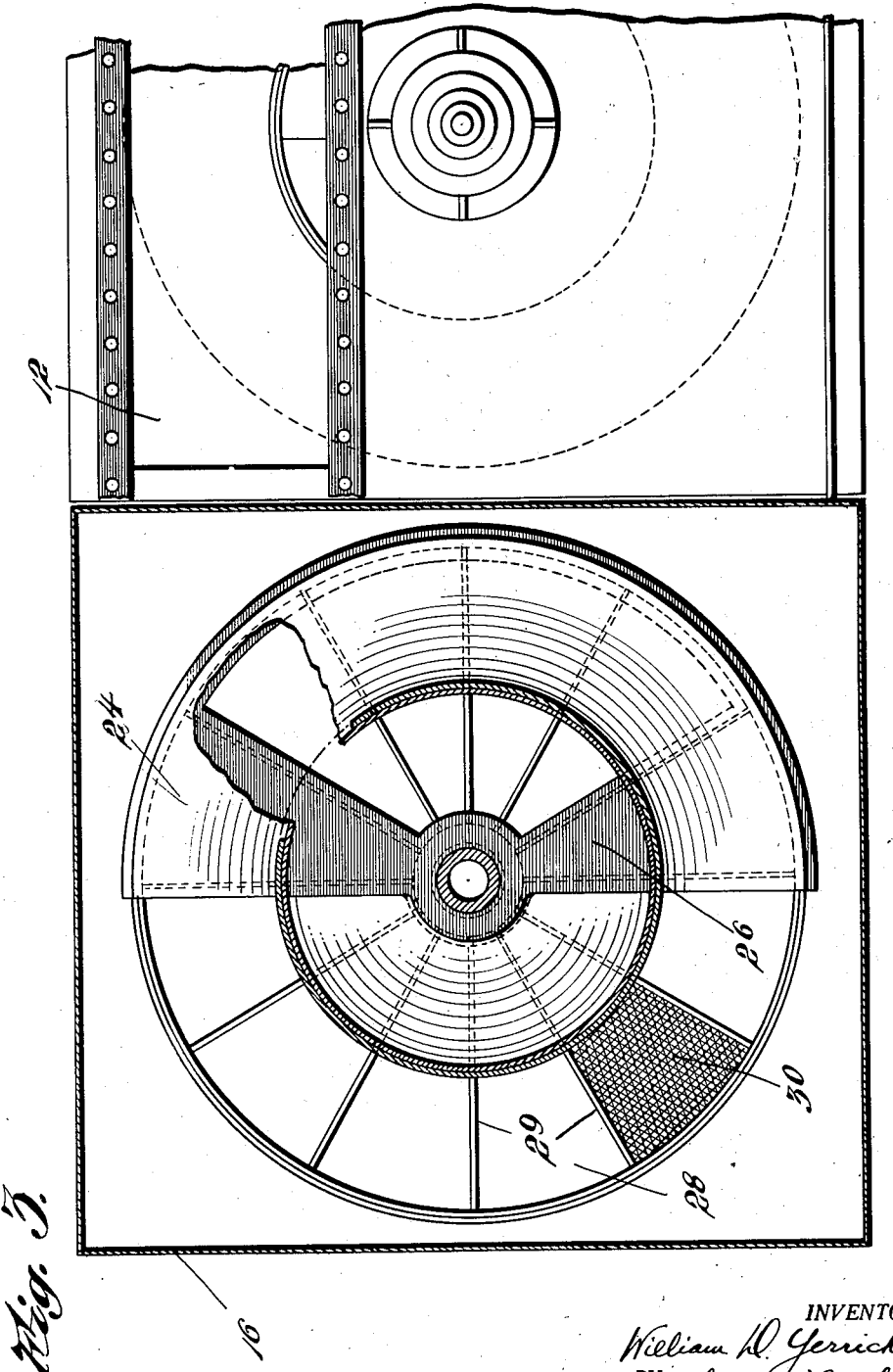
Fig. 3 is a fragmentary top plan view, with parts removed and broken away.

Separating diaphragms 24, 25 are provided to seal the chambers 18 and 19 from the central chamber, and flow valves 26, 27 are mounted in the diaphragms 26, 27 to provide the necessary flow passages for the combustion air. The annulus 20, as shown in Figures 3 and 4, includes a number of sections 28, separated by vertical partitions 29, and cooperates with the valves 26, 27 to provide air and flue gas flow passages as the valves turn to alternately bring the regenerative material 30 in the sections 28 into the flue gas and the air flow passageways for receiving heat from the flue gases, storing the heat, and giving off the stored heat to the combustion air.

The drive shafts are preferably driven from below, as shown in Figure 4 each unit having a depending split casing 31 for receiving a worm gear 32 mounted on the shaft, each casing having an operating shaft 33 extending therethrough with a worm wheel 34 mounted thereon in mesh with the worm gear 32. The operating shafts 33 for the various units are joined by connecting shafts 35 in the usual manner, the end operating shaft being connected to the shaft of an operating motor 36.

As shown in Figure 4, the vertical shafts 21 are mounted on adjustable thrust bearings 37 of any well-known type, and are operatively connected to the valves 27. To facilitate manufacture and compensate for slight changes in alignment and the like, it is preferred to form the shafts 21 as solid shafts and key the shafts 21 to upper tubular shafts 38 which are secured to the upper valves 26, thus permitting a slight play under the varying heat changes. The upper end of each shaft 38 is mounted on an aligning cylindrical bearing 39 secured to the upper end of the casing, this bearing preferably having an opening 40 therethrough for cooling.

Figure 2:
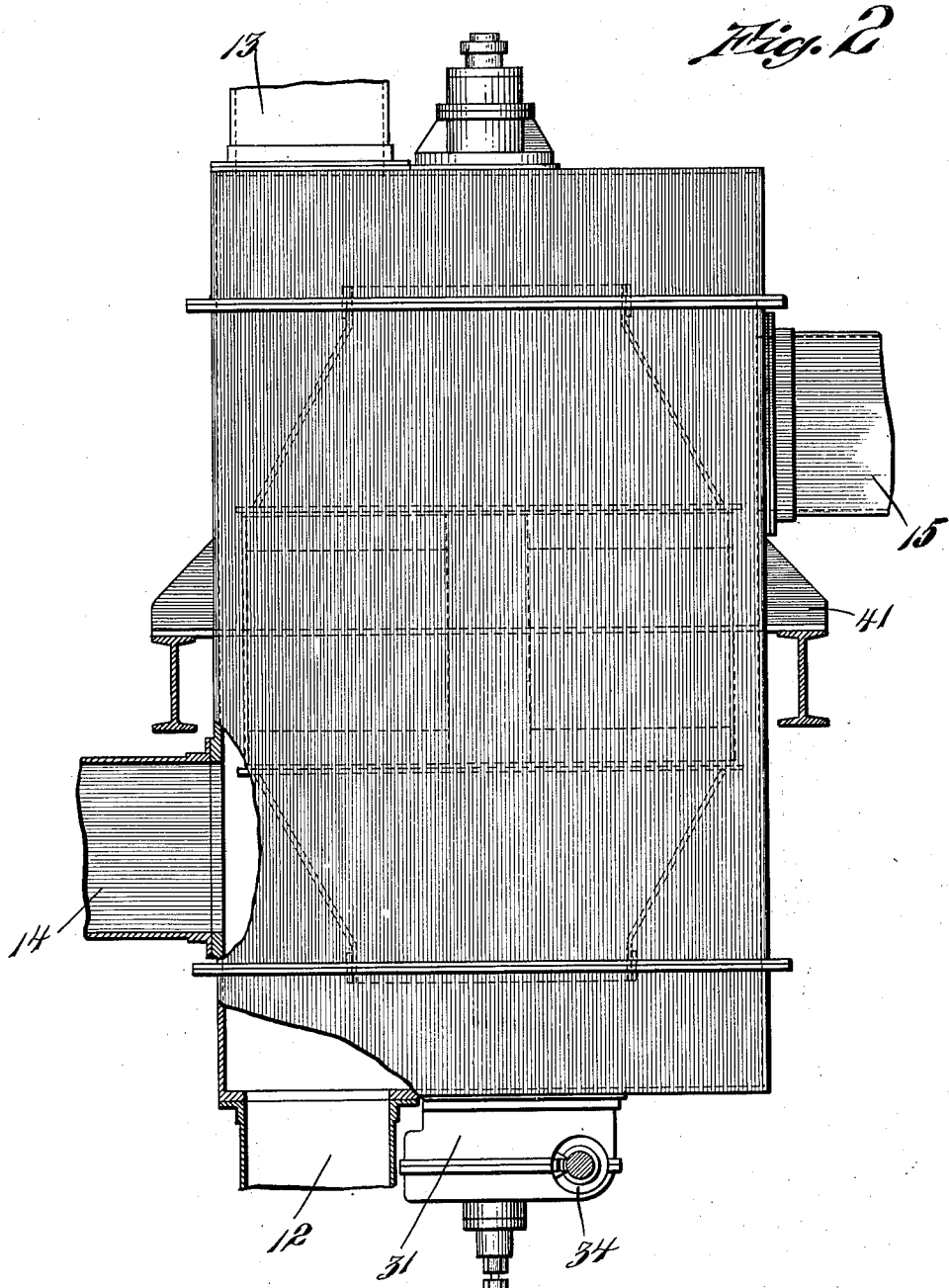
Fig. 2 is a side view thereof, partly broken away.

The casings, as shown in Figure 2, are preferably provided with side supports 41 which rest on bearing beams of any well known type. The pin connections between the two shafts and lower shaft and worm gear are all floating fits.

My improved construction provides a preheater unit which may be joined to similar units to form a preheater battery of any desired capacity. The battery is of relatively small width, thus adapting it for use in modern boiler plants, and the units may be replaced, removed, or added, as desired.

While I have described one specific construction of preheater unit, it is obvious that desired changes in arrangement of the parts, in the interior structure, and in the relative proportions, may be made without departing from the spirit and the scope of the invention as defined in the appended claims.

I claim:

1. In a preheater unit, a casing of generally rectangular formation, horizontal partitions dividing said casing into four superimposed chambers, regenerative material positioned in the intermediate chambers and having passages therethrough, rotatable valves in the intermediate chambers communicating said upper and lower chambers, with each other through selected passages in the regenerative material, a tubular shaft connected to the upper valve, a solid shaft connected to the lower valve and keyed to said tubular shaft, means for operating said valves, longitudinally disposed flow conduits connected to the upper and lower chambers, and laterally disposed flow conduits connected to the intermediate flow chambers.

2. In a heat exchanger, a casing, regenerative material in said casing having passages therethrough, an inlet and an outlet for a fluid to be heated, an inlet and an outlet for a fluid to be cooled, movable valve means mounted adjacent the ends of the regenerative material for selectively communicating the regenerative material passages with the inlet and outlet for the fluid to be heated and for the fluid to be cooled, a shaft connected to one valve for operating the same, and a second shaft connected to the other valve for operating the same, said shafts being detachably keyed together.

3. In a heat exchanger, a casing, regenerative material in said casing having passages therethrough, an inlet and an outlet for a fluid to be heated, an inlet and an outlet for a fluid to be cooled, movable valve means mounted adjacent the ends of the regenerative material for selectively communicating the regenerative material passages with the inlet and outlet for the fluid to be heated and for the fluid to be cooled, a tubular shaft connected to one valve for operating the same, and a solid shaft connected to the other valve for operating the same, said shafts being detachably keyed together.

WILLIAM D. YERRICK.